(12) United States Patent
Kadous

(10) Patent No.: US 7,940,663 B2
(45) Date of Patent: May 10, 2011

(54) MITIGATING ACK/NACK ERRORS IN MIMO/SIC/HARQ

(75) Inventor: Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1098 days.

(21) Appl. No.: 11/182,694

(22) Filed: Jul. 15, 2005

(65) Prior Publication Data

US 2006/0018259 A1    Jan. 26, 2006

Related U.S. Application Data

(60) Provisional application No. 60/589,816, filed on Jul. 20, 2004, provisional application No. 60/688,091, filed on Jun. 6, 2005.

(51) Int. Cl.
*G01R 31/08* (2006.01)

(52) U.S. Cl. .................. 370/235; 370/329; 370/338

(58) Field of Classification Search .............. 370/216, 370/230, 231, 236, 236.1, 236.2, 328, 329, 370/338; 455/69, 522; 714/748, 749, 750, 714/751, 758, 799

See application file for complete search history.

(56) References Cited

U.S. PATENT DOCUMENTS

| | | | |
|---|---|---|---|
| 6,005,876 A | 12/1999 | Cimini, Jr. et al. | |
| 6,158,041 A | 12/2000 | Raleigh et al. | |
| 6,160,840 A | 12/2000 | Park | |
| 7,379,434 B2 * | 5/2008 | Moulsley et al. | 370/318 |
| 7,397,864 B2 | 7/2008 | Tarakh et al. | |
| 7,436,795 B2 | 10/2008 | Jiang | |
| 2002/0159431 A1 | 10/2002 | Moulsley et al. | |
| 2003/0128705 A1 | 7/2003 | Yi et al. | |
| 2004/0190523 A1 | 9/2004 | Gessner et al. | |
| 2005/0068908 A1 | 3/2005 | Qian et al. | |
| 2009/0042519 A1 | 2/2009 | Sudo | |

FOREIGN PATENT DOCUMENTS

| | | |
|---|---|---|
| EP | 1187386 | 3/2002 |
| EP | 1271835 A2 | 1/2003 |
| EP | 1298829 A1 | 4/2003 |
| KR | 1020040039489 | 5/2004 |
| KR | 1020040053187 | 6/2004 |
| WO | 03032564 | 4/2003 |
| WO | 03034611 | 4/2003 |

OTHER PUBLICATIONS

International Search Report—PCT/US05/025855, International Search Authority—European Patent Office—Dec. 22, 2005.
Written Opinion of the International Search Authority—PCT/US05/025855, International Search Authority—European Patent Office—Jan. 20, 2007.

(Continued)

*Primary Examiner* — Derrick W Ferris
*Assistant Examiner* — Matthew Hopkins
(74) *Attorney, Agent, or Firm* — Milan Patel; Howard Seo

(57) ABSTRACT

Systems and methodologies are described that facilitate mitigating effects of mismatch errors related to incorrectly decoded acknowledgments indicative of successfully decoded data packets in a wireless network environment. Misinterpretation of a cumulative acknowledgment related to a number of successfully decoded data packets can be identified, and data packet transmission mismatch errors caused thereby can be evaluated to determine an optimal manner in which to decode and acknowledge remaining data packets to alleviate mismatch and restore synchronization between a transmitter of the data packets and a receiver thereof.

41 Claims, 11 Drawing Sheets

OTHER PUBLICATIONS

Abe T et al: "A hybrid MIMO system using spatial correlation" Wireless Personal Multimedia Communications, 2002. The 5th International AL Symposium on Oct. 27-30, 2002, Piscataway, NJ, USA, IEEE, vol. 3, Oct. 27, 2002, pp. 1346-1350, XP010619313 ISBN: 978-0-7803-7442-3 * p. 1347, right-hand column, paragraph 2.2.a—p. 1348, left-hand column, paragraph 2.3.

Madhukumar A S et al: "Incorporating incremental redundancy and link adaptation in communication systems using residue number systems" IEEE 54th Vehicular Technology Conference. VTC Fall 2001. Proceedings Oct. 7-11, 2001 Atlantic City, NJ, USA; [IEEE Vehicular Technolgy Conference]. IEEE 54th Vehicular Technology Conference. VTC Fall 2001. Proceedings (CAT. No.01CH37211) IEEE Piscata, vol. 4, Oct. 7, 2001, pp. 2272-2276, XP010562374 ISBN: 978-0-7803-7005-0 * p. 2274, left-hand column, paragraph III—right-hand column; figures 2,3.

Onggosanusi E N et al: "Capacity analysis of frequency-selective MIMO channels with sub-optimal detectors" 2002 IEEE International Conference on Acoustics, Speech, and Signal Processing, Proceedings. (ICASSP). Orlando, FL, May 13-17, 2002; [IEEE International Conference on Acoustics, Speech, and Signal Processing (ICASSP)], New York, NY IEEE, US, vol. 3, May 13, 2002, pp. 111-2369, XP010803828 ISBN: 978-0-7803-7402-7 * p. 2370, left-hand column, paragraph 3 ** p. 2371; figure 1.

* cited by examiner

MITIGATING ACK/NACK ERRORS IN MIMO/SIC/HARQ

CROSS-REFERENCE TO RELATED APPLICATIONS

This application claims benefit under 35 U.S.C. § 119(e) of U.S. Provisional Patent application Ser. No. 60/589,816 entitled "A Mechanism for Mitigating ACK/NACK errors in MIMO/SIC/HARQ" and filed on Jul. 20, 2004 and Provisional Patent Application Ser. No. 60/688,091 entitled "Mitigating ACK/NACK errors in MIMO/SIC/HARQ" filed Jun. 6, 2005 the entirety of which is hereby incorporated by reference. This application contains information related to U.S. patent application Ser. No. 10/785,292 entitled Incremental Redundancy Transmission for Multiple Parallel Channels in a MIMO Communication System and filed on Feb. 23, 2004.

BACKGROUND

I. Field

The following description relates generally to wireless communications, and more particularly to mitigating acknowledgement interpretation errors and deleterious effects associated therewith to improve throughput in a wireless network environment.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Conventional network transmission protocols are susceptible to mismatch errors that can destroy synchronization between transmit and receive chains, resulting in substantial data loss and diminished network throughput. Thus, there exists a need in the art for a system and/or methodology of improving throughput in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with mitigating acknowledgement interpretation errors in a wireless network environment employing a multiple input, multiple output protocol in conjunction with a hybrid automatic request (HARQ) retransmission protocol. Systems and methods are described that facilitate identifying misinterpretation of a cumulative acknowledgment related to a number of successfully decoded data packets, and evaluating data packet transmission mismatch errors caused thereby to determine an optimal protocol for continuing data packet decoding to alleviate mismatch and restore synchronization between a transmitter of the data packets and a receiver thereof.

According to an aspect, a method of mitigating effects of acknowledgement interpretation errors during communication in a wireless network can comprise identifying an error related to interpretation of an acknowledgement indicative of a successfully decoded data packet, identifying error type, and remedially restoring a state of synchronization between a receiver that provided the acknowledgement and a transmitter that misinterpreted the acknowledgement, based at least in part on the type of error identified. The method can further comprise employing a hybrid automatic request (HARQ) protocol for transmission of one or more data packets between the transmitter and the receiver, as well as employing cumulative acknowledgement protocol for acknowledging successful decode by the receiver of at least one data packet to the transmitter of the at least one data packet.

According to another aspect, a system that facilitates mitigation of throughput deterioration due to mismatch errors in a wireless network can comprise a transmitter that transmits one or more data packets utilizing a HARQ protocol, and a receiver that receives the one or more data packets and provides a cumulative acknowledgement to the transmitter related to a number of successfully decoded data packets. The receiver can comprise a decoder that decodes the one or more data packets and an acknowledgement component that generates the acknowledgment, as well as an error detection component that detects a mismatch error caused by a misinterpreted acknowledgement. The receiver can further comprise an energy estimation component that estimates an energy level for at least one data packet omitted from or duplicated in a subsequent data packet transmission due to a mismatch error.

According to yet another aspect, an apparatus that facilitates detecting and compensating for mismatch errors in a wireless network is described that can comprise means for receiving a first transmission of at least one data packet, means for decoding the at least one data packet, means for providing an acknowledgement of successful decode of the at least one data packet, and means for determining whether the acknowledgement is correctly interpreted based at least in part on a second transmission of one or more data packets. Additionally, the apparatus can comprise means for decoding and acknowledging data packets based on information obtained through an energy estimation protocol applied to on or more data packets.

According to still another aspect, a computer-readable medium can have stored thereon computer-executable instructions for receiving a first transmission of at least one data packet, decoding the at least one data packet, providing an acknowledgement of successful decode of the at least one data packet, and determining whether the acknowledgement is correctly interpreted based at least in part on a second transmission of one or more data packets. The computer-readable medium can further comprise instructions for evaluating omitted and/or duplicate data packets to determine a next appropriate data packet to decode and/or acknowledge.

Still another aspect relates to a microprocessor that executes instructions for mitigating acknowledgement errors in a wireless network, the instructions comprising receiving a first transmission of at least one data packet, decoding the at least one data packet, providing an acknowledgement of successful decode of the at least one data packet, and determining whether the acknowledgement is correctly interpreted based at least in part on a second transmission of one or more data packets.

Yet another aspect relates to a mobile device that facilitates communicating over a wireless network, comprising a receiving component that receives data packet transmission from a transmitter in the wireless network, an error detection component that identifies at least one of an upward mismatch error and a downward mismatch error, an energy estimation component that evaluates an energy level associated with at least one data packet, and an acknowledgement component that generates an acknowledgement of one or more successfully decoded data packets.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
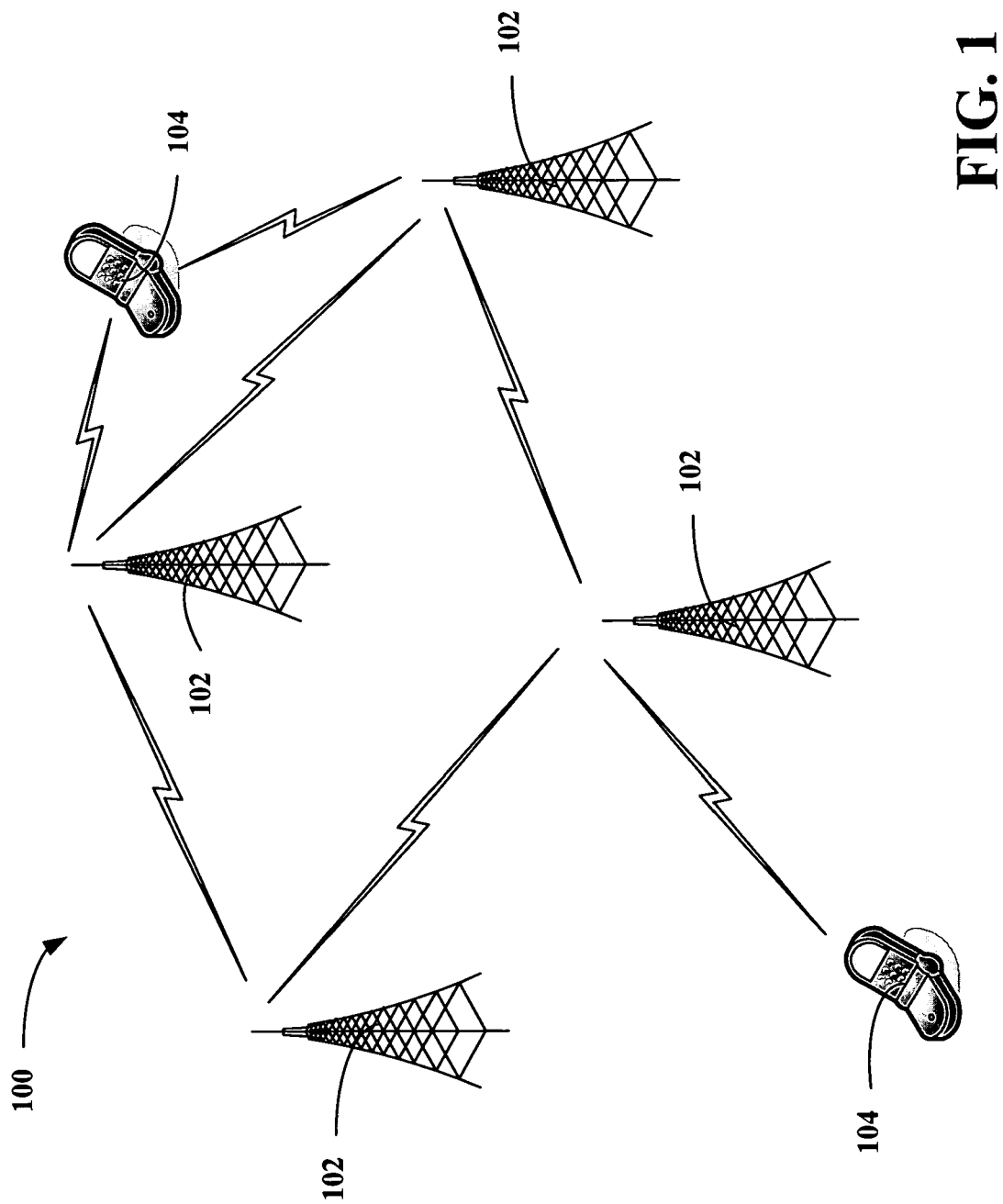
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a wireless network communication system 100 in accordance with various embodiments presented herein. Network 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

Wireless network 100 can employ a multiple input, multiple output (MIMO) communication technique in order to facilitate data transmission over a plurality of signal pathways. By employing a MIMO technique, wireless network 100 and/or components communicating thereon can experience increased throughput due to multipath propagation. Additionally, wireless network 100 can utilize a hybrid automatic request (HARQ) protocol to facilitate retransmission of signals at a layer level. It will be appreciated that the above-described communication techniques can be employed by wireless network 100 in conjunction with any suitable wireless communication protocol (e.g., OFDM, OFDMA, CDMA, TDMA, and the like).

A HARQ protocol is based on successive interference cancellation (SIC), and is also referred to as a blanking layer (BL) protocol. In a BL protocol, multiple codewords, or layers, can be concurrently transmitted and received by a receiver. When the receiver decodes one or more layers, it can generate an acknowledgement indicating successful decode of the layers, which can be transmitted back to the transmitter of the signal. Based on the acknowledgement of successful decode, the transmitter can distribute available transmission power over remaining signal layers, such that remaining layers are transmitted at higher power than previous layers, which in turn increases a probability for successful decode of the remaining layers. When a mismatch error occurs, such as a transmitter misinterpreting an acknowledgement and retransmitting a successfully decoded layer and/or failing to transmit a layer in sequence, network throughput can be diminished. In such cases a potential exists for a total of $N_t$ layers, or data packets, to be dropped from transmission, where $N_t$ is a number of transmit antennas in a wireless network, such as wireless network 100

Figure 2:
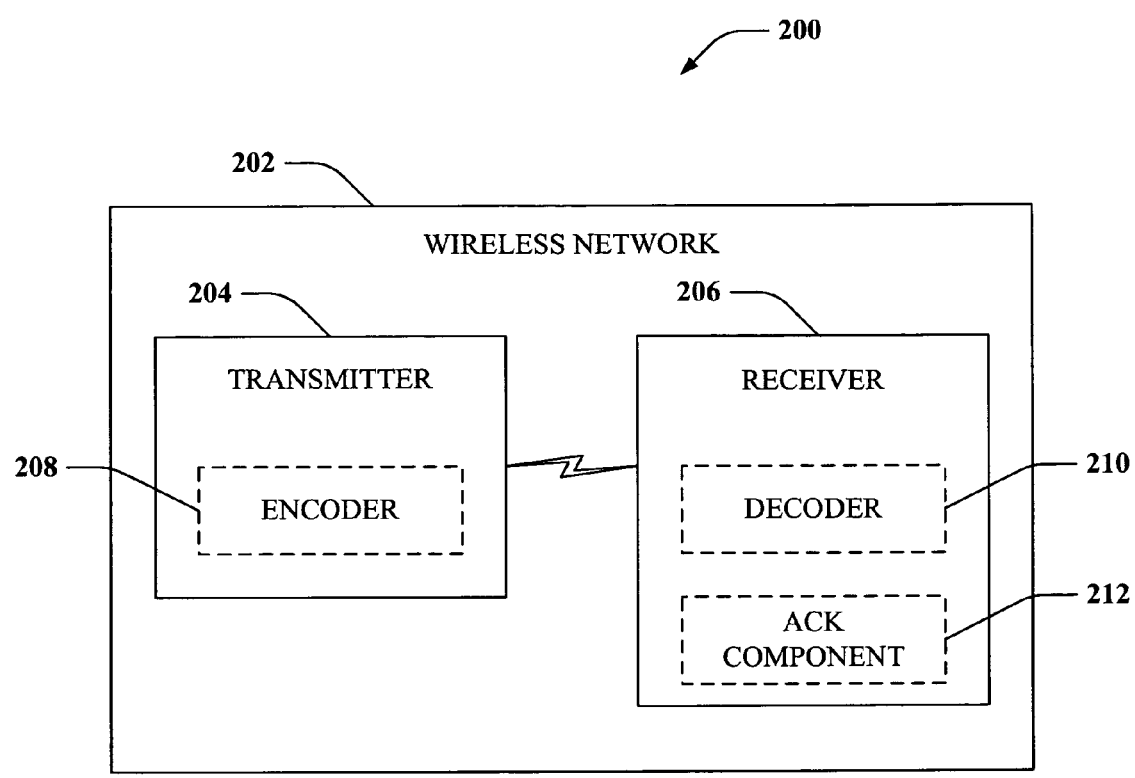
FIG. 2 is an illustration of a system that mitigates throughput loss due to transmission mismatch related to errors during acknowledgement decoding.

FIG. 2 is an illustration of a system 200 that mitigates throughput loss due to transmission mismatch related to errors in acknowledgement decoding. System 200 comprises a wireless network 202 similar to wireless network 100 described above, which is depicted with a transmitter 204 and a receiver 206. Although any number of transmitters 204 and receivers 206 can be comprised by wireless network 202, as will be appreciated by one skilled in the art, a single transmitter 204 that transmits communication data signals to a single receiver 206 is illustrated for purposes of simplicity. Transmitter 204 comprises an encoder component 208 that can modulate and/or encode signals in accordance with any suitable wireless communication protocol (e.g., OFDM, OFDMA, CDMA, TDMA, etc.), which signals can then be transmitted to receiver 206. Receiver 206 comprises a decoder component 210 that can decode a received signal and/or data packets therein for processing. Upon successful decode of a data packet, an acknowledgement component 212 can generate an acknowledgment that indicates successful decode of the data packet, which can be sent to transmitter 206 to inform transmitter 206 that the data packet was received and decoded, and therefore need not be retransmitted.

Acknowledgment component 212 can employ a cumulative acknowledgement protocol. For example, if two data packets (e.g., layers) are successfully decoded, acknowledgement component 212 can transmit an acknowledgement comprising a binary "2" (e.g., 10 binary) without acknowledging each packet separately. Additionally, acknowledgement component 212 can employ an "ON-OFF" acknowledgement protocol, whereby an acknowledgement is only generated and/or transmitted upon successful decode of one or more layers. Such a protocol can also be referred to as an acknowledgement/no acknowledgement, or "ACK/NACK" protocol.

Figure 3:
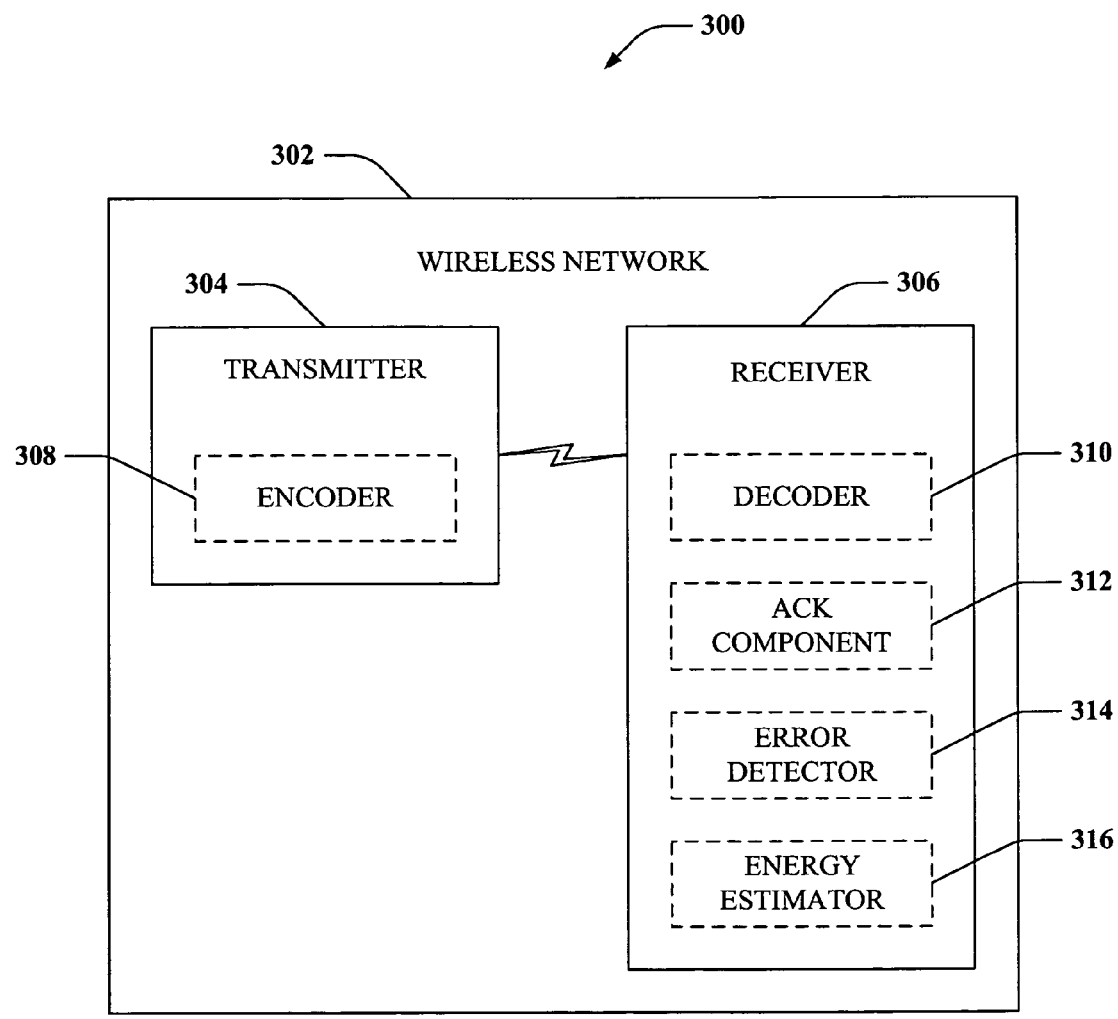
FIG. 3 is an illustration of a system that facilitates detecting transmission mismatch errors due to misinterpreted decode acknowledgements in accordance with one or more aspects.

FIG. 3 is an illustration of a system 300 that facilitates detecting transmission mismatch errors due to misinterpreted decode acknowledgements in accordance with one or more aspects. System 300 comprises a wireless network 302, similar to wireless network 100, which employs MIMO and HARQ protocols to transmit communication data packets and acknowledgements. Wireless network 302 comprises a transmitter 304 that sends data to a receiver 306. Transmitter 304 comprises an encoder component that encodes signals and/or data packets for transmission to receiver 306. Receiver 306 comprises a decoder component 310 that decodes received data packets, and an acknowledgement component 312 that generates an acknowledgement of successful packet decode for transmission to transmitter 304. For instance, acknowledgement component 312 can employ a cumulative acknowledgement technique in conjunction with an ACK/NACK protocol, such that the acknowledgement comprises a binary value indicative of the number of sequential packets successfully decoded to inform transmitter 304 of such and permit transmitter 304 to identify an appropriate series of data packets for a subsequent transmission. In the event that no data packets are successfully decoded, no acknowledgement (NACK) will be generated, and such lack of acknowledgement serves to inform transmitter 304 that no packets were decoded successfully and the previous transmission should be repeated.

Receiver can additionally comprise an error detection component 314 that identifies mismatch between an expected data packet series transmission and facilitates compensating for the mismatch by synchronizing receiver 306 to transmitter 304. For example, in the event that transmitter 304 erroneously decodes an acknowledgement, a subsequent transmission can be compromised (e.g., transmitter 304 may transmit a series of data packets that contains a repeated data packet or that fails to contain a sequential data packet expected by receiver 306).

For instance, according to a specific example, decoder 310 can successfully decode layer 1 of a three-layer signal, and acknowledgement component 312 can send an acknowledgement comprising a binary value of "01" to indicate successful decode of the first data packet. If transmitter 304 incorrectly interprets the acknowledgement as "10" binary, or an indication that layers 1 and 2 were successfully decoded, then on a subsequent transmission transmitter 304 will transmit only layer 3. When decoder 310 attempts to decode the subsequent transmission, and receiver 306 is expecting layer 2, only noise (e.g., consistent with inherent system static and the like) will be collected because transmitter 306 is in fact not transmitting layer 2. Error detection component 314, in conjunction with an energy estimation component 316, can estimate the expected energy associated with layer 3, and can recognize that the packet being received is in fact layer 3 and that layer 2 has been dropped. By using energy measurements generated by energy estimation component 316, receiver 306 can determine that layer 2 is dropped, and decoder 310 can proceed to decode layer 3 in order to synchronize receiver 306 to transmitter 304 and mitigate a number of dropped data layers. In this manner, rather than losing $N_t$ layers, dropped layers can be limited to a maximum of $N_t-N_d$ layers (e.g., where $N_t$ is the number of layers transmitted and $N_d$ is the number of layers successfully decoded), in a worst-case scenario. In this manner, rather than losing $N_t-N_d$ layers, if any layers are lost due to an upward mismatch error, a number thereof will be between 1 and $N_t-N_d$. According to this example, only one layer, layer 2, is dropped. It will be appreciated that the preceding example is illustrative in nature and is not intended to limit the number of data packets that can be transmitted and/or acknowledged in a given signal, the manner in which errors are detected, compensated, etc.

Figure 4:
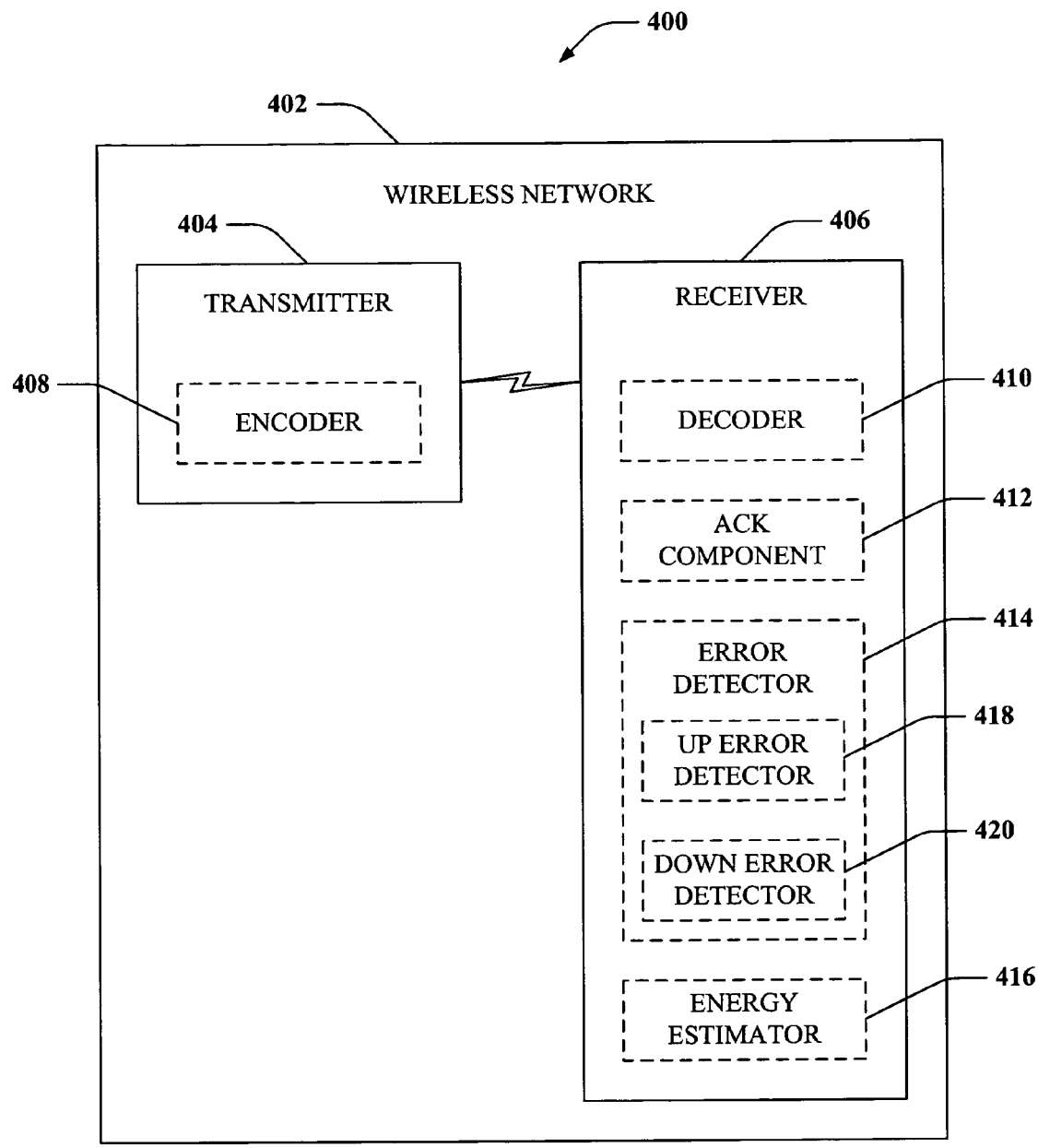
FIG. 4 is an illustration of a system that facilitates detecting an upward error in acknowledgement interpretation and compensating there for to synchronize receiver-transmitter communication and mitigate throughput loss, in accordance with various aspects.

FIG. 4 is an illustration of a system 400 that facilitates detecting an upward error in acknowledgement interpretation and compensating there for to synchronize receiver-transmitter communication and mitigate throughput loss, in accordance with various aspects. System 400 comprises a wireless network 402 over which one or more mobile devices (e.g., cellular phones personal communication devices, . . . ) can communicate. Wireless network 402 is illustrated as comprising a transmitter 404 and a receiver 406, although it will be appreciated that wireless network can in fact comprise a plurality of transmitters and receivers, as well as related communication components. For the sake of simplicity of illustration, transmitter 404 can be a transmitter chain from a first antenna in wireless network 402 and receiver 404 can be a receiver chain in a second antenna in wireless network 402. Additionally, transmitter 404 and receiver 406 can be part of a base station and/or part of a mobile device, as described with regard to various aspects herein.

Transmitter 404 comprises an encoder 408 that encodes and/or modulates communication signals according to one or more protocols employed by the wireless network (e.g., OFDM, OFDMA, CDMA, TDMA, . . . ). Receiver 406 comprises a decoder component 410 that decodes received signals and/or packets or layers therein for analysis by receiver 406. Receiver further comprises an acknowledgement component 412 that can provide acknowledgement messages to transmitter 404 utilizing, for example, cumulative acknowledgement protocols in conjunction with an ON-OFF acknowledgement technique, as described with regard to preceding figures. Receiver 406 further comprises an energy estimation component 416 that facilitates assessing predicted signal energy to assist an error detection component 414 in determining that transmitter 404 has erroneously decoded an acknowledgement and has caused an upward mismatch error between transmitter 404 and receiver 406.

Error detection component 414 can comprise an "upward" error detector 418 and a "downward" error detector 420 to facilitate compensating for various types of mismatch errors in order to synchronize receiver 406 to transmitter 404 and mitigate throughput deterioration during a communication session. For example, an upward mismatch error can occur when receiver 406 sends an acknowledgement of successful decode of a number of layers, $N_d$, and transmitter 404 erroneously interprets the acknowledgement as some larger number (e.g., $N_{d+1}$) of successfully decoded packets, as described above with regard to FIG. 3. Upon a subsequent transmission, transmitter 404 will send fewer layers than are expected by receiver 406. For instance, according to this example, receiver 406 can be expecting layer $N_{d+1}$ to lead a subsequent packet series transmission, but transmitter 404 erroneously transmits $N_{d+2}$ as a first data packet in the subsequent transmission. In such a case, energy estimation component can estimate an energy level for layer $N_{d+1}$. If the estimated energy level for layer $N_{d+1}$ is below a predetermined minimum threshold level, it can be assumed that layer $N_{d+1}$ is not being transmitted (e.g., has been dropped due to the interpretation error by transmitter 404), and upward error component 418 can direct decoder 410 to proceed to attempt to decode layer $N_{d+2}$ (e.g., a next sequentially-expected data packet) in order to synchronize receiver 406 to transmitter 404 and mitigate further loss of data packets. Such can be iterated for multiple layers until synchronization is achieved.

A downward mismatch error can occur when receiver 406 sends an acknowledgement indicating successful download/decode of a number of layers $N_d$ and transmitter 404 incorrectly interprets the acknowledgment as indicative of some number of layers less than $N_d$. In a subsequent transmission, transmitter 404 will send duplicate layers due to the misinterpretation of the acknowledgement. In order to provide a check to guard against such mismatch, downward error detection component 420 can attempt to decode layer $N_d$ prior to decoding the subsequent transmission. If no acknowledgement interpretation error has occurred, then any attempt to decode $N_d$ will result in receiver 406 collecting only noise, because transmitter 404 is not transmitting layer $N_d$.

However, upon recognition of a downward mismatch error, decoder 410 can proceed to decode layer $N_{d+1}$, and acknowledgement component 412 can send an acknowledgement to transmitter 404 upon successful decode of layer $N_{d+1}$. If the new acknowledgement is interpreted correctly by transmitter 404, then transmitter 404 and receiver 406 have been successfully synchronized. In the event that layer $N_{d+1}$ is not successfully decoded, then an acknowledgement can be generated and transmitted by acknowledgement component 412 to again indicate successful decode of layer $N_d$.

According to another example, a first transmission from transmitter 404 can comprise a number of data layers $N_t=4$. Receiver 406 can successfully decode and acknowledge layers 1 and 2. Transmitter 404 can erroneously interpret the acknowledgement as 1, then transmitter 404 can transmit layers 2, 3, and 4, wherein layer 2 represents a redundant transmission. Before decoding layer 3, receiver 406 can regenerate, reconstruct, etc., a codeword of layer 2 (and optionally layer 1), since layer 2 has already been decoded, and can identify the portion of layer 2 that would be transmitted if transmitter 404 misread the acknowledgement. Downward error component 420 can correlate the reconstructed codeword to the redundant transmission, and can evaluate whether the correlation exhibits a sufficiently high value (e.g., above a predetermined threshold, such as a 50% match, a 75% match, or any other desired threshold value) to warrant disregarding the redundant layer and proceeding to decode a next layer in the transmission. If the correlation threshold is satisfied, receiver 406 can recognize the redundancy and decoder 410 can proceed with decoding the next expected layer (e.g., layer 3 according to this example). Upon successful decoding, acknowledgement component 416 can generate and transmit an acknowledgement, which, if properly interpreted by transmitter 406, will result in synchronization of receiver 406 and transmitter 404. If layer 3 is not successfully decoded, then acknowledgement component 412 can acknowledge layer 2, which will similarly restore receiver 406 and transmitter 404 to a synchronous state.

Figure 5:
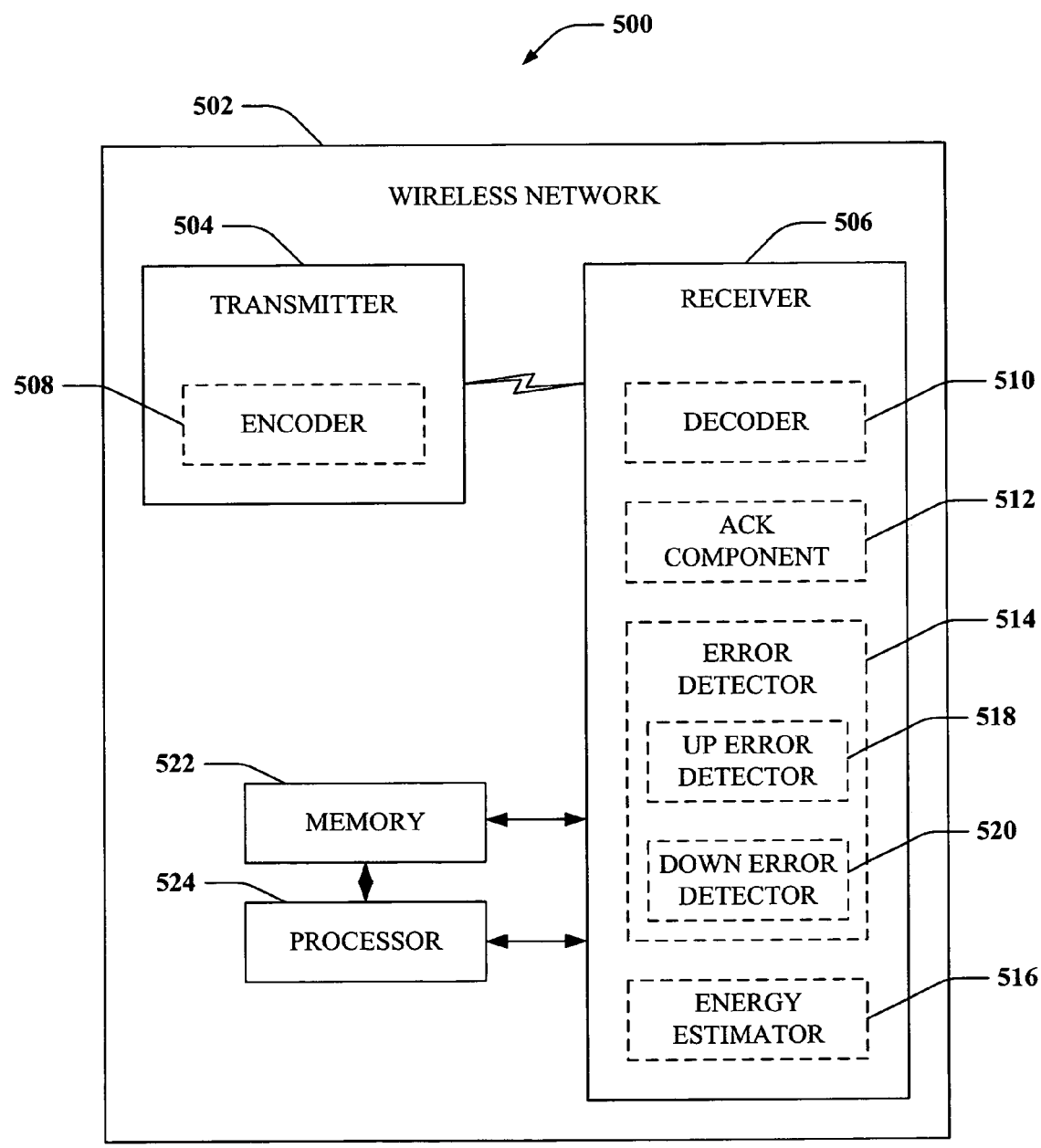
FIG. 5 illustrates a system that facilitates mitigating throughput deterioration due to acknowledgement misinterpretation in a wireless network environment.

FIG. 5 illustrates a system 500 that facilitates mitigating throughput deterioration due to acknowledgement misinterpretation in a wireless network environment. System 500 comprises a wireless network 502, similar the networks described in conjunction with preceding figures. Network 502 is illustrated with a transmitter 504 and a receiver 506, although a plurality of such can be employed, as will be understood by one skilled in the art. Transmitter 504 comprises an encoder 508 that can encode outgoing signals according to a particular modulation scheme employed by network 502. Such signal can be received by receiver 506 and decoded by decoder 510. An acknowledgement component 512 can generate an acknowledgement indicative of successfully decoded data packets, or layers, transmitted in the signal, and can return the acknowledgement to transmitter 504. Receiver 506 can additionally comprise an error detection component 514 and a signal energy estimator 516 that facilitate detecting errors related to transmitter 504 misinterpretation of one or more acknowledgements. Error detection component 514 can comprise an upward-error detection component 518 that detects upward mismatch errors by transmitter 504, and a downward-error detection component that detects downward mismatch errors caused by transmitter 504, as detailed with regard to FIG. 4.

System 500 can additionally comprise memory 522 that is operatively coupled to receiver 506 and that stores information related to data packets and/or layers received, decoded layers, acknowledged layers, layer energy estimation, and any other suitable information related to detecting mismatch errors and compensating there for to mitigate network throughput deterioration. A processor 524 can be operatively connected to receiver 506 (and/or memory 522) to facilitate analysis of information related to received signal layers, decoded layers, acknowledgement generation, error detection, resynchronization, and the like. It is to be appreciated that processor 524 can be a processor dedicated to analyzing and/or generating information received by receiver 506, a processor that controls one or more components of system 500, and/or a processor that both analyzes and generates information received by receiver 506 and controls one or more components of system 500.

Memory 522 can additionally store protocols associated with generating acknowledgements, detecting mismatch errors, taking remedial action to resynchronize receiver 506 and transmitter 504, etc., such that system 500 can employ stored protocols and/or algorithms to achieve improved throughput in a wireless network as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 522 of the subject systems and methods is intended to comprise, without being limited to, these and any other suitable types of memory.

Figure 6:
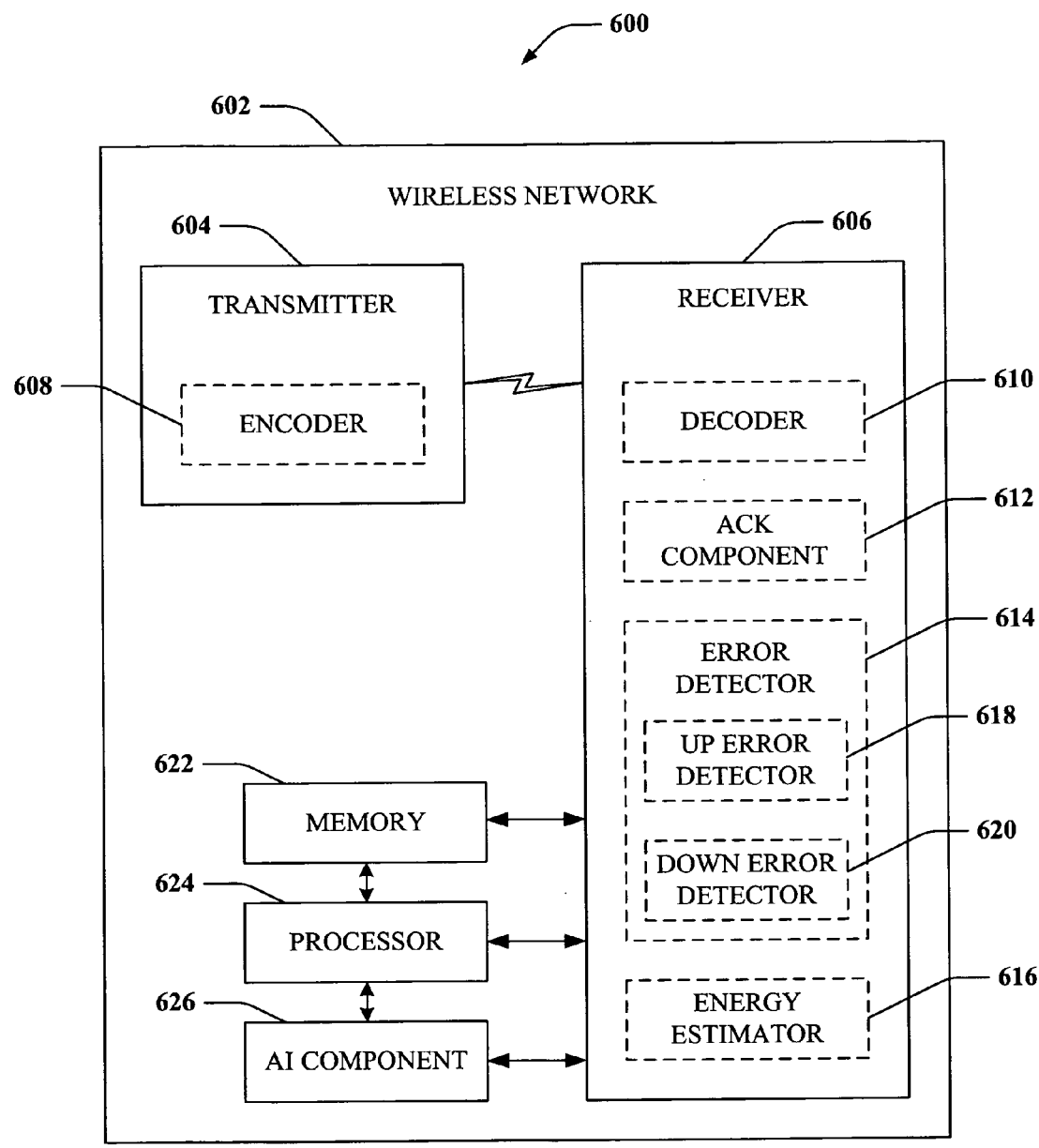
FIG. 6 is an illustration of a system that facilitates detecting acknowledgement misinterpretation errors in a wireless network environment and compensating there for to maintain synchrony between a transmitter chain and a receiver chain in the network.

FIG. 6 is an illustration of a system 600 that facilitates detecting acknowledgement misinterpretation errors in a wireless network environment and compensating there for to maintain synchrony between a transmitter chain and a receiver chain in the network. System 600 comprises a wireless network 602, similar the networks described in conjunction with preceding figures. Wireless network 602 is illustrated with a transmitter 604 and a receiver 606, although a plurality of such can be employed in a network, as will be understood by one skilled in the art. Transmitter 604 comprises an encoder 608 that encodes outgoing signals according to a particular modulation scheme (e.g., OFDM, OFDMA, CDMA, FDMA, . . . ) employed by network 602. One or more signals can be received by receiver 606 and decoded by decoder 610. Receiver 606 comprises an acknowledgement component 612 that can generate an acknowledgement of successfully decoded data packets, or layers, which can be comprised by the signal, and can return the acknowledgement to transmitter 604. Receiver 606 can additionally comprise an error detection component 614 and a signal energy estimator 616 that facilitate detecting errors related to transmitter 604 misinterpretation of one or more acknowledgements as described with regard to preceding figures. Error detection component 614 can comprise an up-error detection component 618 that detects upward mismatch errors by transmitter 604, and a down-error detection component that detects downward mismatch errors caused by transmitter 604, as detailed with regard to FIG. 4.

System 600 can additionally comprises a memory 622 and a processor 624 as detailed above with regard to FIG. 5, which can be operatively associated with receiver 606 and with each other. Moreover, an AI component 626 can be operatively associated with receiver 606 and can make inferences regarding error detection, signal energy estimation, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI component 626 can infer an appropriate threshold energy level above which a layer is determined to be present and below which a layer is determined to be absent from a given signal, based at least in part on, for instance, average transmission energy levels, etc. According to this example, it can be determined that an error has occurred due to a misinterpretation by transmitter 604 of an acknowledgement, such as downward mismatch error, an upward mismatch error, and the like. AI component 626, in conjunction with processor 624 and/or memory 622, can determine that layers are duplicated in a subsequent signal transmission and/or are absent there from. AI component 626 can infer that a check should be performed to assess a previously received layer, for example, in the event that a downward mismatch error is detected. In such a case, AI component 626 can facilitate inferring an appropriate energy threshold level over which a layer is deemed present in a transmission and below which a layer is deemed absent from a transmission, thereby improving network throughput and mitigating transmission costs. It will be appreciated that the foregoing examples are illustrative in nature and are not intended to limit the scope of inferences that can be made by the AI component 626 or the manner in which the AI component 626 makes such inferences.

Referring to FIGS. 7-10, methodologies relating to generating supplemental system resource assignments are illustrated. For example, methodologies can relate to improve network throughput by compensating for acknowledgement interpretation errors in an OFDM environment, an OFDMA environment, a CDMA environment, a TDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
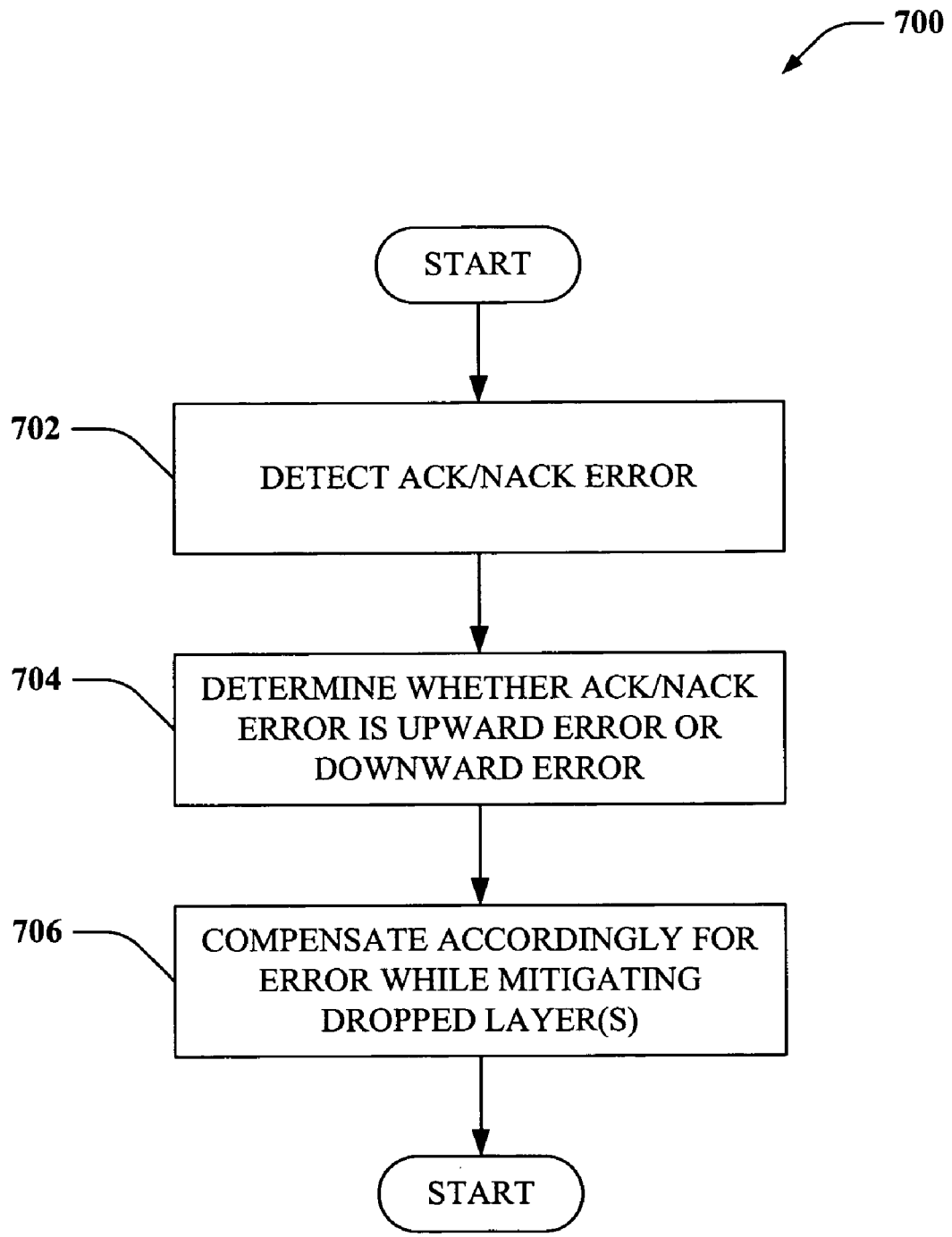
FIG. 7 is an illustration of a methodology for mitigating mismatch errors between transmitter chains and receiver chains during signal transmission between antennas in a wireless network.

FIG. 7 is an illustration of a methodology 700 for mitigating mismatch errors between transmitter chains and receiver chains during signal transmission between antennas in a wireless network. At 702, an ACK/NACK error can be evaluated and/or identified and/or detected. Upon a determination that such error is present, a determination can be made regarding the nature of the error (e.g., upward or downward), at 704.

For example, a MIMO communication technique can be employed in the wireless network in order to facilitate data transmission over a plurality of signal pathways to provide increased throughput due to multipath propagation. Additionally, HARQ protocol can be employed to facilitate retransmission of signals at a layer level. It will be appreciated that the above-described communication techniques can be employed by the wireless network in conjunction with any suitable wireless communication protocol (e.g., OFDM, OFDMA, CDMA, TDMA, and the like), in accordance with method 700. When a mismatch error occurs, such as a transmitter misreading an acknowledgement and retransmitting a successfully decoded layer and/or failing to transmit a layer in a sequence, network throughput can be detrimentally affected.

Additionally, a cumulative acknowledgement protocol can be employed in the network. For example, if two data packets (e.g., layers) are successfully decoded, an acknowledgement comprising a binary "2" (e.g., 10 binary) can be transmitted without acknowledging each packet separately. Additionally, the network can employ an ON-OFF acknowledgement protocol, whereby an acknowledgement is only generated and/or transmitted upon successful decode of one or more layers. Such a protocol can also be referred to as an acknowledgement/no acknowledgement, or ACK/NACK protocol.

Evaluation of the ACK/NACK error at 704 can comprise determining whether a layer has been transmitted redundantly or has been mistakenly omitted from a transmission due to an acknowledgement misread. In either case, at 706, remedial actions can be taken by to identify the type of error and to restore synchrony between the transmitter chain and receiver chain while minimizing a number of layers that are dropped as a result of the mismatch error.

Figure 8:
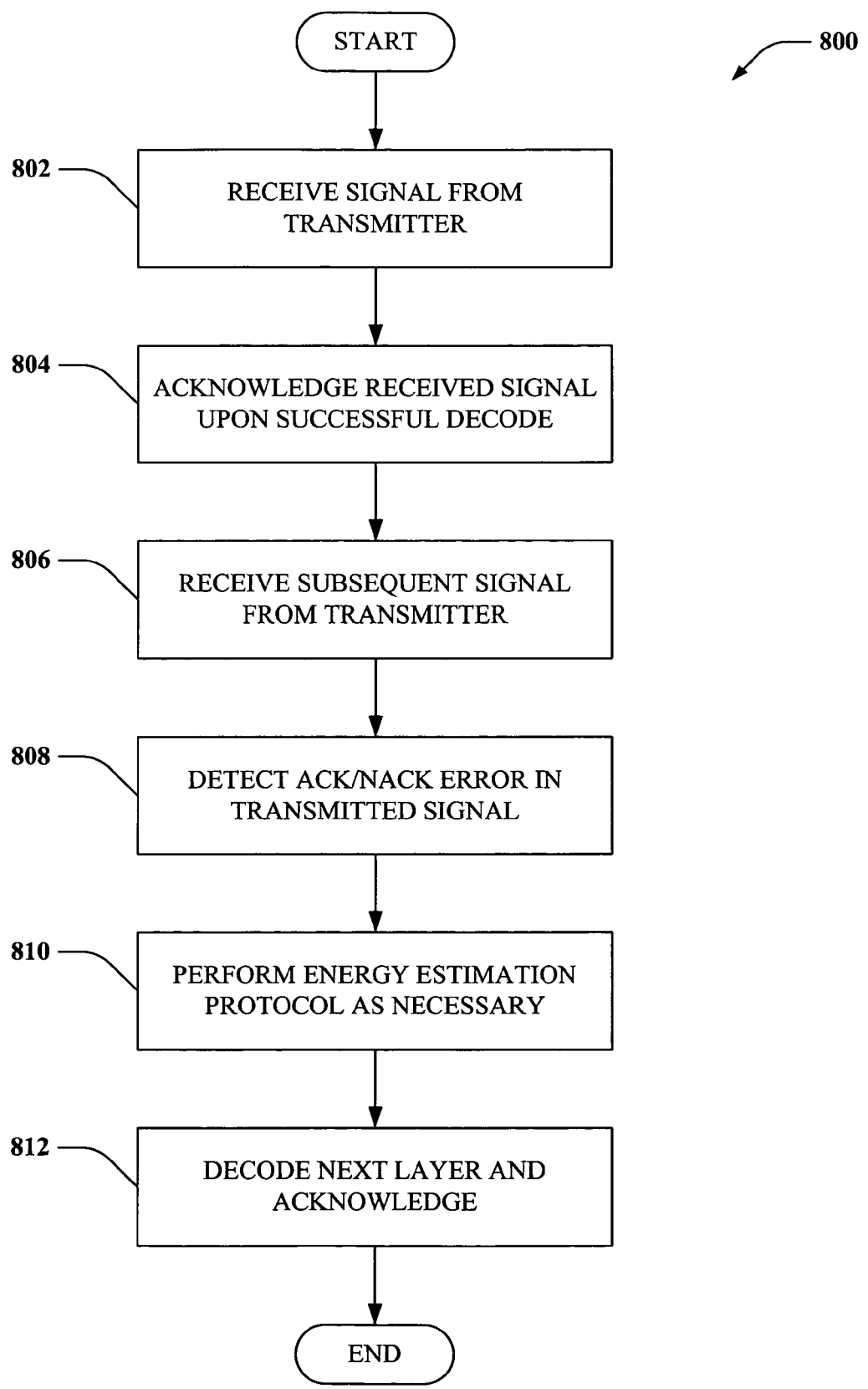
FIG. 8 is an illustration of a methodology for re-synchronizing a receiver chain in an antenna to a transmitter chain in another antenna in a wireless network upon a determination that the respective chains have lost synchronicity due to a mismatch error.

FIG. 8 is an illustration of a methodology 800 for re-synchronizing a receiver chain in an antenna to a transmitter chain in another antenna in a wireless network upon a determination that the respective chains have lost synchronicity due to a mismatch error. At 802, a first signal comprising one or more layers can be received from a transmitter. Upon successful decode of the one or more layers, an acknowledgement of such can be provided to the transmitter to inform the transmitter that a subsequent series of layers can be transmitted, at 804. A signal comprising the subsequent series of layers can be received at 806. At 808, it can be determined that an ACK/NACK error has occurred. At 810, an energy estimation protocol can be optionally performed to estimate, for example, an energy level associated with a next expected layer in a sequence. The estimated energy level can be compared to a predetermined threshold such that if the estimation is below the threshold, it can be determined that the acknowledgment of 804 was incorrectly decoded (e.g., in the case of an upward error), and that a layer is missing from the expected sequence. In the case of a downward acknowledgement error, no energy estimation/noise evaluation need be performed. Rather, a correlation protocol can be performed such as described with regard to FIG. 4, above, and with regard to FIG. 10, below. Based on such determination, the method can proceed to 812 to decode and acknowledge a next layer(s) in the signal.

Figure 9:
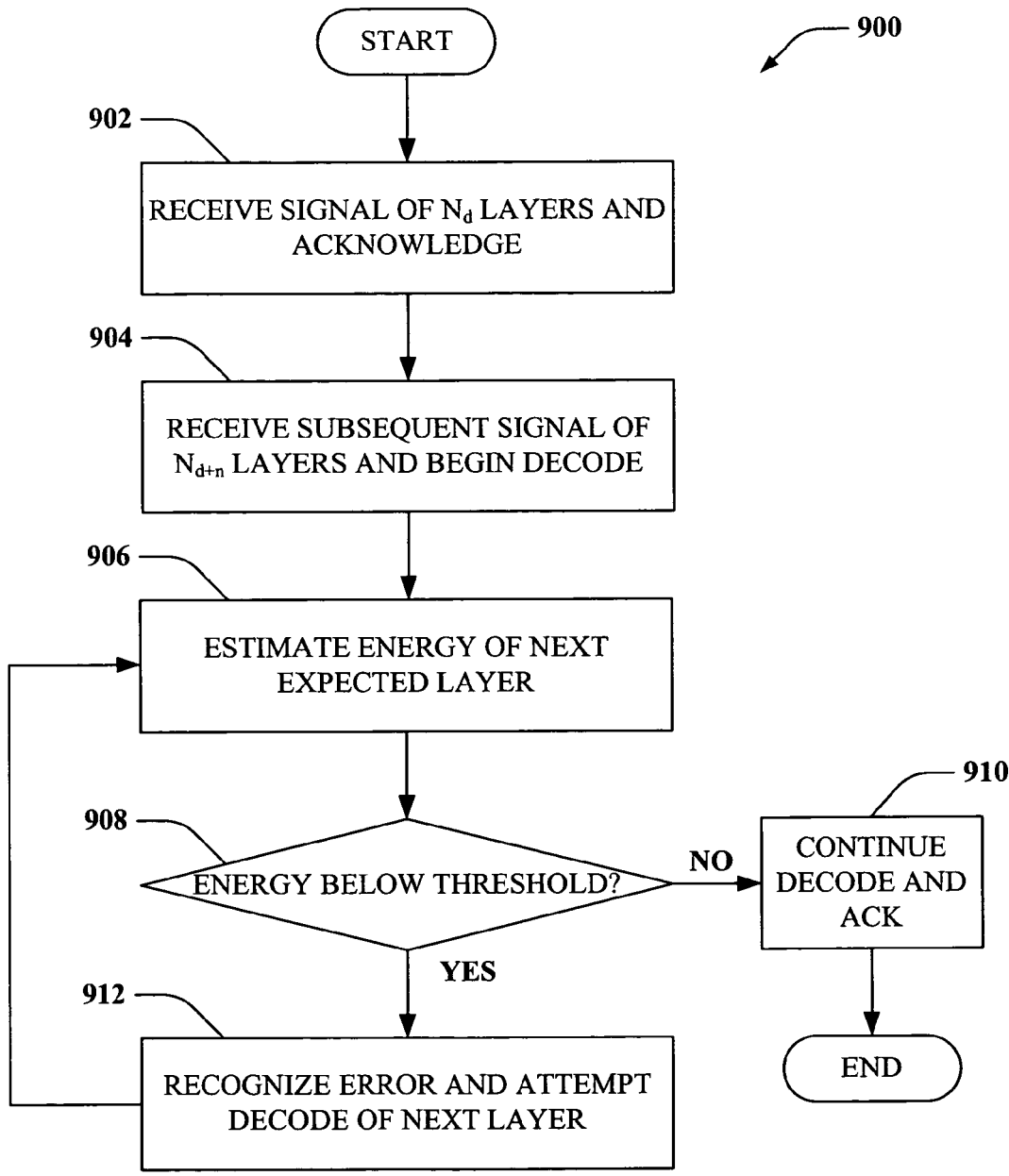
FIG. 9 is an illustration of a methodology for restoring a state of synchronization to between a receive chain of an antenna and a transmit chain of another antenna upon detection of a mismatch error in a wireless communication environment.

FIG. 9 is an illustration of a methodology 900 for restoring a state of synchronization to between a receive chain of an antenna and a transmit chain of another antenna upon detection of a mismatch error in a wireless communication environment. At 902, a signal can be received by a receive chain, wherein the signal comprises $N_d$ layers, or data packets, and the receive chain can generate and send an acknowledgement of a number of packets successfully decoded to a transmit chain that sent the signal. At 904, a subsequent signal comprising $N_{d+n}$ layers can be received and decoding thereof can be initiated. If the transmit chain misinterprets or incorrectly decodes the acknowledgement provided at 902 as an acknowledgement of a larger number of successfully decoded data packets (e.g., an upward interpretation error), then the signal received at 904 will omit data packets between the last successfully decoded packet of 902 and a first packet in the subsequent signal of 904. In order to evaluate such an error, at 906, transmission power can be assessed using an energy estimation technique for a next expected layer (e.g., $N_{d+1}$) in order to determine whether the layer is present in the subsequent signal received at 904. At 908, a determination can be made regarding the energy level is below a predetermined threshold. If not, then the layer is deemed to be present, and decoding and acknowledgement of successful decode of one or more of the $N_{d+n}$ data packets can proceed as normal at 910.

If the energy estimated at 906 is determined at 908 to be lower than the predetermined threshold value, then an assumption can be made that the acknowledgement generated at 902 was incorrectly interpreted as indicating a larger number of successfully decoded data packets and has triggered one or more data packets to be omitted from the subsequent signal received at 904. Thus, at 912, the upward mismatch error can be recognized, and a next sequential data packet (e.g., $N_{d+2}$) can be slated for decoding. The method can revert to 906 for further iteration of energy estimation, etc., to evaluate whether layer $N_{d+2}$ and/or have been omitted until a transmitted layer is identified and decoded. At this point, receive and transmit chains will be re-synchronized.

Figure 10:
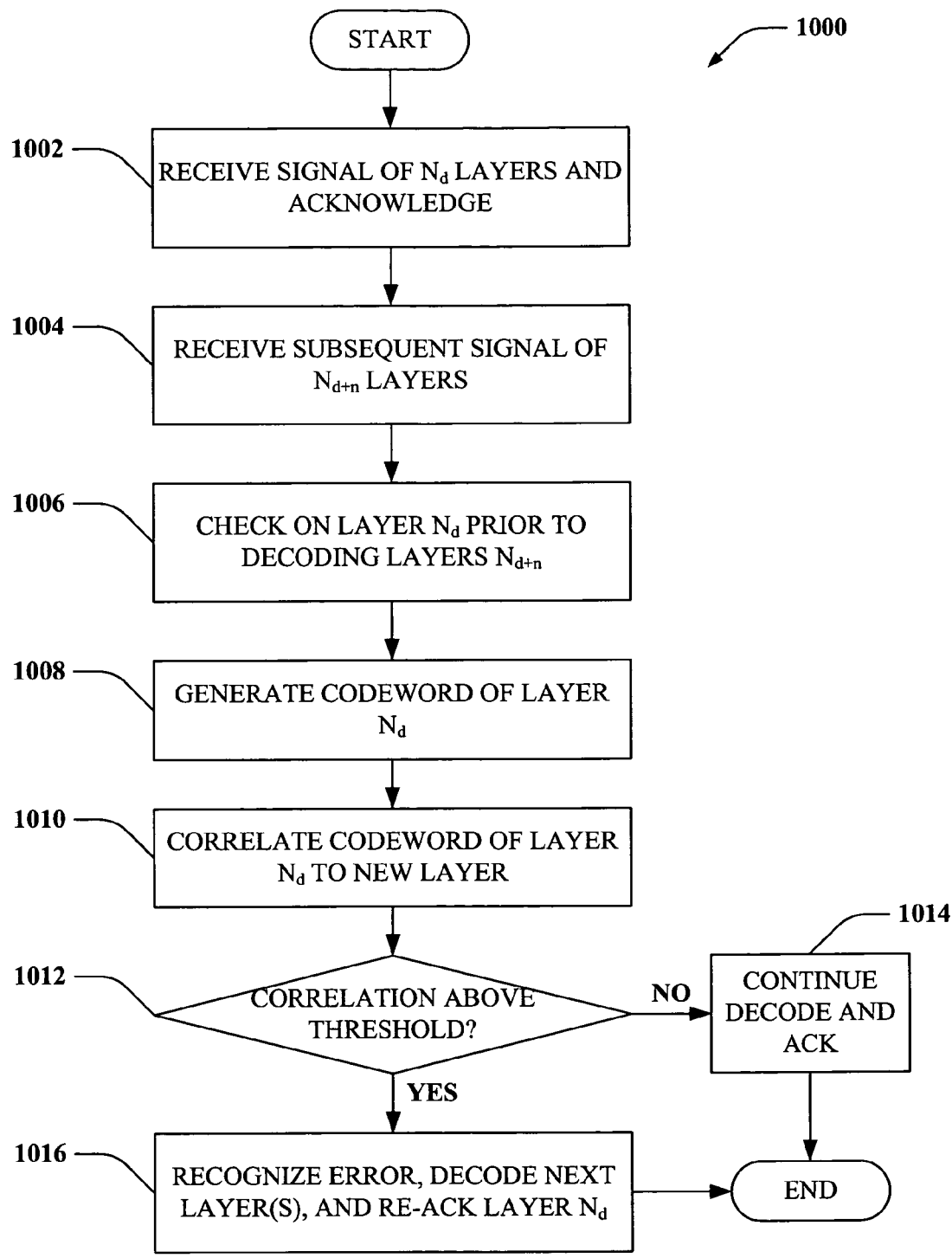
FIG. 10 is an illustration of a methodology for mitigating throughput deterioration in a wireless environment by compensating for mismatch error between transmit and receive chains in a wireless network.

FIG. 10 is an illustration of a methodology 1000 for mitigating throughput deterioration in a wireless environment by compensating for downward mismatch error between transmit and receive chains in a wireless network. At 1002, a signal comprising $N_d$ layers can be received and acknowledged (e.g., an acknowledgement comprising a number of sequential data packets successfully decoded can be transmitted from a receive chain that received the signal to a transmit chain that sent the signal). At 1004, a subsequent signal comprising $N_{d+n}$ layers, or data packets, can be received. At 1006, and before decoding layers $N_{d+n}$, a check can be performed for redundant transmission of layer $N_d$, to determine whether a downward mismatch error has occurred (e.g., whether the transmit chain has incorrectly decoded the acknowledgement provided at 1002 as acknowledging fewer than all successfully decoded data packets).

At 1008, a codeword (e.g., replica, duplicate, . . . ) of layer $N_d$ can be generated based at least in part on information obtained during the previous decode of layer $N_d$ at 1002. The codeword can comprise all or a portion of layer $N_d$. At 1010, a correlation technique can be performed to compare the codeword to a next layer in the signal comprising layers $N_{d+n}$, received at 1004. At 1012, a determination can be made regarding the level of correlation between the codeword and the layer in question to evaluate whether a minimum amount of similarity is present. For example, a predetermined threshold value can be enforced (e.g., 50%, 60%, or any other suitable threshold level), above which the codeword and the layer in question are deemed equivalents of each other.

If the determination at 1012 indicates that a sufficiently high correlation exists between the codeword and, in this example, layer $N_d$, then it can be assumed that layer $N_d$ has been redundantly transmitted in the subsequent signal received at 1004, despite acknowledgement of previous successful decode of layer $N_d$ at 1002. In such a case, at 1016, the downward mismatch error (e.g., misinterpretation by the transmitter that the initial acknowledgement indicated successful decode of fewer than all data packets actually decoded) can be recognized, layers $N_{d+1}$ through $N_{d+n}$ can be decoded, and a new acknowledgement can be generated acknowledging successful decoding of layer $N_d$ as well as layers $N_{d+n}$. In this case, by re-acknowledging layer $N_d$, synchronization can be achieved between transmitter and receiver.

In the event that the determination at 1012 indicates that less than the predetermined threshold level of correlation is present between the codeword and layer $N_d$, then an assumption can be made that layer $N_d$ is not present in the subsequent signal received at 1004. In this case, the method can proceed to 1014, where decode and acknowledgement of layers $N_{d+N}$ can proceed as normal, because no downward mismatch error has occurred.

Figure 11:
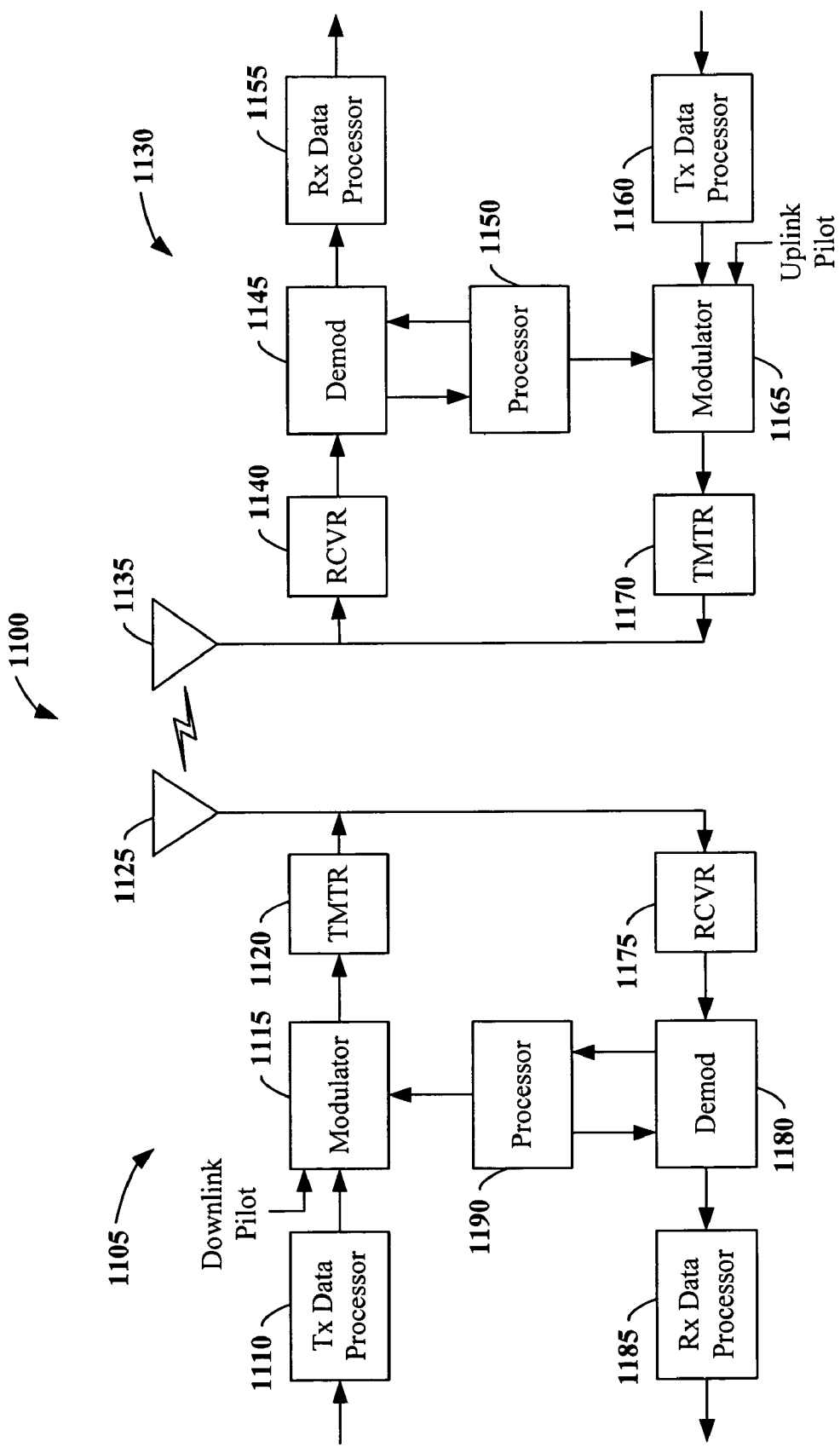
FIG. 11 is an illustration of a wireless network environment that can be employed in conjunction with the various systems and methods described herein.

FIG. 11 shows an exemplary wireless communication system 1100. The wireless communication system 1100 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-6) and/or methods (FIGS. 7-10) described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A modulator 1115 receives and processes the data symbols and pilot symbols and provides a stream of symbols. A modulator 1120 multiplexes data and pilot symbols on the proper subbands, provides a signal value of zero for each unused subband, and obtains a set of N transmit symbols for the N subbands for each symbol period. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM). In the case of an OFDM system, modulator 1120 can transform each set of N transmit symbols to the time domain using an N-point IFFT to obtain a "transformed" symbol that contains N time-domain chips. Modulator 1120 typically repeats a portion of each transformed symbol to obtain a corresponding symbol. The repeated portion is known as a cyclic prefix and is used to combat delay spread in the wireless channel.

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A demodulator 1145 removes the cyclic prefix appended to each symbol, transforms each received transformed symbol to the frequency domain using an N-point FFT, obtains N received symbols for the N subbands for each symbol period, and provides received pilot symbols to a processor 1150 for channel estimation. Demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by demodulator 1145 and RX data processor 1155 is complementary to the processing by modulator 1115 and TX data processor 1110, respectively, at access point 1100.

On the uplink, a TX data processor 1160 processes traffic data and provides data symbols. A modulator 1165 receives and multiplexes the data symbols with pilot symbols, performs modulation, and provides a stream of symbols. The pilot symbols may be transmitted on subbands that have been assigned to terminal 1130 for pilot transmission, where the number of pilot subbands for the uplink may be the same or different from the number of pilot subbands for the downlink. A transmitter unit 1170 then receives and processes the stream of symbols to generate an uplink signal, which is transmitted by the antenna 1135 to the access point 1110.

At access point 1110, the uplink signal from terminal 1130 is received by the antenna 1125 and processed by a receiver unit 1175 to obtain samples. A demodulator 1180 then processes the samples and provides received pilot symbols and data symbol estimates for the uplink. An RX data processor 1185 processes the data symbol estimates to recover the traffic data transmitted by terminal 1135. A processor 1190 performs channel estimation for each active terminal transmitting on the uplink. Multiple terminals may transmit pilot concurrently on the uplink on their respective assigned sets of pilot subbands, where the pilot subband sets may be interlaced.

Processors 1190 and 1150 direct (e.g., control, coordinate, manage, etc.) operation at access point 1110 and terminal 1135, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access OFDM system (e.g., an orthogonal frequency division multiple-access (OFDMA) system), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of mitigating effects of acknowledgement interpretation errors during communication in a wireless network, comprising:
    identifying an error related to interpretation of an acknowledgement indicative of a successfully decoded data packet;
    determining error type, wherein the error is a downward mismatch error in which a transmitter incorrectly interprets the acknowledgment as indicating that a smaller number of data packets were successfully decoded by a receiver than actually were successfully decoded, and wherein the transmitter redundantly transmits one or more data packets in a subsequent transmission based at least in part on the incorrect interpretation of the acknowledgement;
    generating, by the receiver, a replica of a last successfully decoded data packet prior to decoding data packets in the subsequent transmission, and comparing the replica to a data packet in the subsequent transmission to determine whether a predetermined threshold correlation value is exceeded; and
    remedially restoring a state of synchronization between the receiver that provided the acknowledgement and the transmitter that misinterpreted the acknowledgement, based at least in part on the type of error identified.

2. The method of claim 1, further comprising employing a hybrid automatic request (HARQ) protocol for transmission of one or more data packets between the transmitter and the receiver.

3. The method of claim 2, further comprising employing cumulative acknowledgement protocol for acknowledging successful decode by the receiver of at least one data packet to the transmitter of the at least one data packet.

4. The method of claim 1, wherein the error is an upward mismatch error in which the transmitter incorrectly interprets the acknowledgment as indicating that a greater number of data packets were successfully decoded by the receiver than actually were successfully decoded.

5. The method of claim 4, wherein the transmitter omits one or more data packets from a subsequent transmission based at least in part on the incorrect interpretation of the acknowledgement.

6. The method of claim 5, further comprising estimating an energy level associated with the omitted data packet and comparing the estimated energy level to a predetermined threshold value to verify that the omitted data packet is not present in the subsequent transmission.

7. The method of claim 6, further comprising initiating a decode of a next expected data packet in the subsequent transmission.

8. The method of claim 7, further comprising providing an acknowledgement of a successfully decoded data packet, received in the subsequent transmission, to the transmitter.

9. The method of claim 8, wherein the transmitter and the receiver are synchronized when the transmitter correctly interprets the acknowledgement of the successfully decoded data packet received in the subsequent transmission.

10. The method of claim 1, further comprising recognizing the data packet as a redundant data packet when the correlation between the data packet and the replica exceeds the predetermined threshold correlation value.

11. The method of claim 10, further comprising initiating decoding of a next expected data packet in the subsequent transmission.

12. The method of claim 11, further comprising providing an acknowledgement of a successfully decoded data packet that was received in the subsequent transmission, to the transmitter.

13. The method of claim 11, further comprising providing an acknowledgement of the last successfully decoded data packet if no data packet received in the subsequent transmission is successfully decoded.

14. The method of claim 1, executed by a mobile device.

15. The method of claim 14, wherein the mobile device is at least one of a cellular phone, a smart phone, a laptop, a handheld communication device, a handheld computing device, a satellite radio, a global positioning system, or a personal digital assistant.

16. An apparatus that facilitates mitigation of throughput deterioration due to mismatch errors in a wireless network, comprising:
a transmitter that transmits one or more data packets utilizing a hybrid automatic request (HARQ) protocol; and
a receiver that receives the one or more data packets utilizing a HARQ protocol, provides a cumulative acknowledgement to the transmitter related to a number of successfully decoded data packets, and remedially compensates for mismatch errors related to misinterpretation of an acknowledgement at the transmitter, wherein the receiver further comprises
a decoder that decodes the one or more data packets and an acknowledgement component that generates the acknowledgment,
an error detection component that detects a mismatch error caused by a misinterpreted acknowledgement, and comprises a downward mismatch error detection component that identifies a downward mismatch error related to an acknowledgement that is incorrectly interpreted as indicating a lesser number of successfully decoded packets than were actually successfully decoded and generates a codeword for at least one successfully decoded data packet duplicated in a subsequent data packet transmission due to the downward mismatch error, wherein the receiver compares the codeword to a duplicate data packet to evaluate whether a predetermined threshold correlation value is exceeded.

17. The apparatus of claim 16, the error detection component comprises an upward mismatch error detection component that identifies an upward mismatch error related to an acknowledgement that is incorrectly interpreted as indicating a greater number of successfully decoded packets than were actually successfully decoded.

18. The apparatus of claim 17, the receiver further comprises an energy estimation component that estimates an energy level for at least one data packet omitted from a subsequent data packet transmission due to the upward mismatch error.

19. The apparatus of claim 18, the receiver compares the estimated energy level to a predetermined threshold value to ensure that the data is not present in the subsequent data packet transmission.

20. The apparatus of claim 19, the decoder decodes a next expected data packet and acknowledges the decode if successful.

21. The apparatus of claim 16, the decoder disregards the duplicate data packet and initiates a decode of a next expected data packet when the predetermined threshold correlation value is exceeded.

22. The apparatus of claim 21, the acknowledgement component provides an acknowledgement of a successful decode of the next expected data packet if the decode thereof is successful.

23. The apparatus of claim 21, the acknowledgement component provides an acknowledgement of a successful decode of the duplicate data packet if the decode of the next expected data packet is unsuccessful.

24. An apparatus that facilitates detecting and compensating for mismatch errors in a wireless network, comprising:
means for receiving a first transmission of at least one data packet; means for decoding the at least one data packet;
means for providing an acknowledgement of successful decode of the at least one data packet;
means for determining whether the acknowledgement is correctly interpreted based at least in part on a second transmission of one or more data packets;
means for identifying an error related to interpretation of an acknowledgement indicative of a successfully decoded data packet, wherein the error is a downward mismatch error in which the acknowledgment is incorrectly interpreted as indicating that a smaller number of data packets were successfully decoded by the means for receiving than actually were successfully decoded, and wherein at least a portion of the second transmission of one or more data packets are redundantly transmitted based at least in part on the incorrect interpretation of the acknowledgement;
means for generating a replica of a last successfully decoded data packet prior to decoding data packets in the second transmission, and comparing the replica to a data packet in the second transmission to determine whether a predetermined threshold correlation value is exceeded; and
means for remedially restoring a state of synchronization between the means for receiving and a means for transmitting one or more data packets, which misinterpreted the acknowledgement, based at least in part on the identified error.

25. The apparatus of claim 24, further comprising means for determining whether one or more expected data packets are omitted from the second transmission.

26. The apparatus of claim 25, further comprising means for proceeding decoding the one or more data packets in the second transmission upon evaluation of an omitted data packet.

27. The apparatus of claim 26, further comprising means for providing an acknowledgement of successful decode of at least one data packet in the second transmission to synchronize the means for receiving to the means for transmitting the one or more data packets.

28. The apparatus of claim 24, further comprising means for determining whether one or more successfully decoded data packets are duplicated from the second transmission.

29. The apparatus of claim 28, further comprising means for decoding the one or more data packets in the second transmission upon evaluation of a duplicate data packet.

30. The apparatus of claim 29, further comprising means for providing an acknowledgement of successful decode of at least one data packet in the second transmission to facilitate restoring the state of synchronization between the means for receiving to the means for transmitting the one or more data packets.

31. The apparatus of claim 29, further comprising means for providing an acknowledgement of a successful decode of the duplicate data packet if none of the one or more data packets in the second transmission is successfully decoded.

32. A computer-readable medium having stored thereon computer-executable instructions executed by at least one processor to perform acts of:
receiving a first transmission of at least one data packet;
decoding the at least one data packet;
providing an acknowledgement of successful decode of the at least one data packet;
determining whether the acknowledgement is correctly interpreted based at least in part on a second transmission of one or more data packets;
identifying an error related to interpretation of an acknowledgement indicative of a successfully decoded data packet, wherein the error is a downward mismatch error in which the acknowledgment is incorrectly interpreted as indicating that a smaller number of data packets were successfully decoded after reception than actually were successfully decoded, and wherein one or more data packets are redundantly transmitted in the second transmission based at least in part on the incorrect interpretation of the acknowledgement;
generating a replica of a last successfully decoded data packet prior to decoding the one or more data packets in the second transmission, and comparing the replica to a data packet in the second transmission to determine whether a predetermined threshold correlation value is exceeded; and
remedially restoring a state of synchronization between a receiver that provided the acknowledgement and a transmitter that misinterpreted the acknowledgement, based at least in part on the identified error, wherein the computer-readable medium is at least one of a magnetic storage device, an optical disk, a digital versatile disk, a smart card, or a memory device.

33. The computer-readable medium of claim 32, further comprising instructions for determining whether at least one of an expected data packet and a duplicate data packet is present in the second transmission.

34. The computer-readable medium of claim 33, further comprising instructions for:
bypassing a duplicate data packets, and
decoding a next expected data packet.

35. The computer-readable medium of claim 34, further comprising instructions for providing an acknowledgement of a successfully decoded data packet received during the second transmission.

36. The computer-readable medium of claim 34, further comprising instructions for providing an acknowledgement of the duplicate data packet if no data packets in the second transmission are decoded.

37. The computer-readable medium of claim 33, further comprising instructions for employing an energy estimation protocol to determine whether to proceed with decoding a next expected data packet.

38. The computer-readable medium of claim 37, further comprising instructions for providing an acknowledgement of a successfully decoded data packet in the second transmission.

39. A processor that executes instructions for mitigating acknowledgement errors in a wireless network, comprising:
means for receiving a first transmission of at least one data packet;
means for decoding the at least one data packet;
means for providing an acknowledgement of successful decode of the at least one data packet; and
means for determining whether the acknowledgement is correctly interpreted based at least in part on a second transmission of one or more data packets;
means for identifying an error related to interpretation of an acknowledgement indicative of a successfully decoded data packet, wherein the error is a downward mismatch error in which the acknowledgment is incorrectly interpreted as indicating that a smaller number of data packets were successfully decoded after reception than actually were successfully decoded, and wherein one or more data packets are redundantly transmitted in the second transmission based at least in part on the incorrect interpretation of the acknowledgement;
means for generating a replica of a last successfully decoded data packet prior to decoding the one or more data packets in the second transmission, and comparing the replica to a data packet in the second transmission to determine whether a predetermined threshold correlation value is exceeded; and
means for remedially restoring a state of synchronization between a receiver that provided the acknowledgement and a transmitter that misinterpreted the acknowledgement, based at least in part on the identified error.

40. A mobile device that facilitates communicating over a wireless network, comprising:
a receiving component that receives data packet transmission from a transmitter in the wireless network;
an error detection component that identifies an error comprising at least one of an upward mismatch error or a downward mismatch error related to interpretation of an acknowledgement indicative of a successfully decoded data packet, wherein the error is the downward mismatch error in which a transmitter incorrectly interprets the acknowledgment as indicating that a smaller number of data packets were successfully decoded by the receiving component than actually were successfully decoded, and wherein the transmitter redundantly transmits one or more data packets in the subsequent transmission based at least in part on the incorrect interpretation of the acknowledgement, the error detection component generates a replica of a last successfully decoded data packet prior to decoding the one or more data packets in the subsequent transmission, compares the replica to at least one data packet in the subsequent transmission to determine whether a predetermined threshold correlation value is exceeded, and remedially restores a state of synchronization between the receiving component and the transmitter that misinterpreted the acknowledgement, based at least in part on the identified error;
an energy estimation component that evaluates an energy level associated with the at least one data packet; and an acknowledgement component that generates an acknowledgement of one or more successfully decoded data packets.

41. The mobile device of claim 40, wherein the device is at least one of a cellular phone, a smart phone, a laptop, a handheld communication device, a handheld computing device, a satellite radio, a global positioning system, or a personal digital assistant.

* * * * *